Aug. 11, 1936.   J. O. MATTESON ET AL   2,050,353
VEGETABLE HYDRATOR
Filed March 31, 1934   2 Sheets-Sheet 1

JESSE O. MATTESON
ROBERT H. GUYTON
INVENTORS

PER      Albert J. Fike
ATTORNEY

Aug. 11, 1936. J. O. MATTESON ET AL 2,050,353
VEGETABLE HYDRATOR
Filed March 31, 1934 2 Sheets-Sheet 2

JESSE O. MATTESON
ROBERT H. GUYTON
INVENTORS

PER Albert J. Fihe
ATTORNEY

Patented Aug. 11, 1936

2,050,353

UNITED STATES PATENT OFFICE 2,050,353

VEGETABLE HYDRATOR

Jesse O. Matteson, Muskegon, Mich., and Robert H. Guyton, Chicago, Ill., assignors to The Brunswick-Balke-Collender Company, Chicago, Ill., a corporation of Delaware Application March 31, 1934, Serial No. 718,484

1 Claim. (Cl. 62—89.6)

This invention relates to improvements in vegetable hydrators and has for one of its principal objects the provision of a new means and method of handling vegetables in a cooling cabinet where other foods are also stored.

One of the important objects of this invention is to provide means for both cooling and hydrating vegetables and other food products preferably in conjunction with the usual refrigerating apparatus, or, if desired, as a separate apparatus, which shall retain vegetables and similar food products in a fresh and moist state for a considerably longer time than has heretofore been considered possible.

Another important object of the invention is the provision of means whereby food products or the like are maintained at all times in an atmosphere of desired temperature and humidity whereby the keeping and other similar qualities of such food and other products is considerably enhanced.

Another and still further object is the provision of means, in either open or closed compartments, whereby water of a desired temperature and regulated amount is sprayed or otherwise applied to fresh vegetables or similar food products to keep the same in a fresh and attractive condition while at the same time allowing the display of same to customers, if such display is desired.

Other and further important objects of the invention will be apparent from the disclosures in the accompanying drawings and following specification.

The invention, in a preferred form, is illustrated in the drawings and hereinafter more fully described.

In the drawings—

Figure 1:
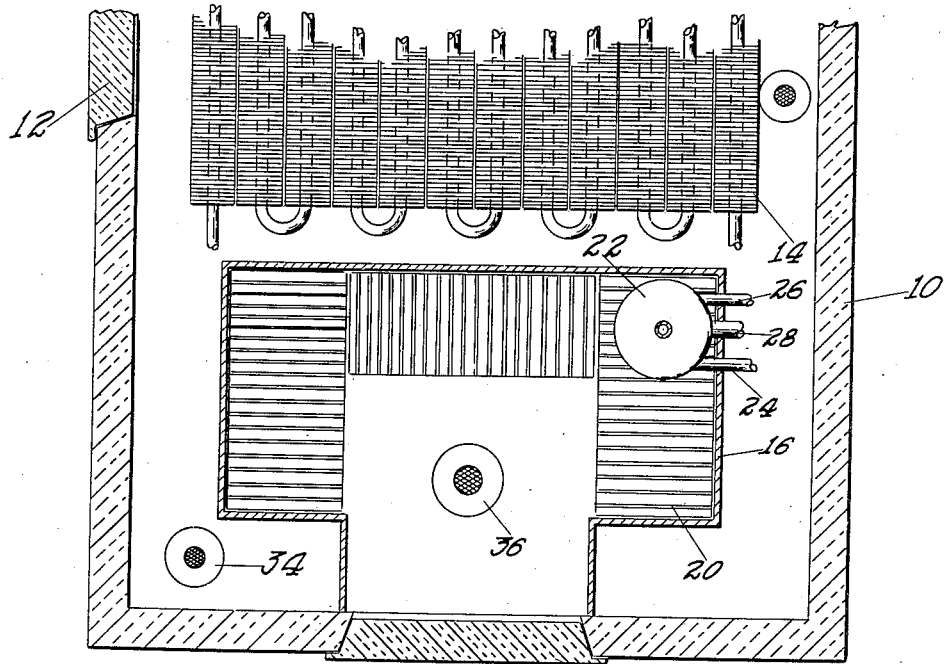
Figure 1 is a horizontal sectional view of the improved vegetable hydrator of this invention.

The reference numeral 10 indicates generally an ordinary refrigerator casing, having the usual door 12 and refrigerating coils 14. Heretofore such a refrigerating apparatus has been commonly used in grocery stores and the like for the indiscriminate storage and handling therein of practically all perishable foods as are ordinarily handled in a grocery store or similar business. It has been found by experience that fresh vegetables, particularly, are subject to wilting on account of the fact that the refrigerating apparatus itself has a tendency to dehydrate materials in the refrigerator, this moisture finally condensing on the refrigerator coils, as is commonly known. Such dehydrating obviously results in a quick wilting of the vegetables, with consequent loss of attractiveness and sales possibilities and additional liability to spoilage.

Figure 2:
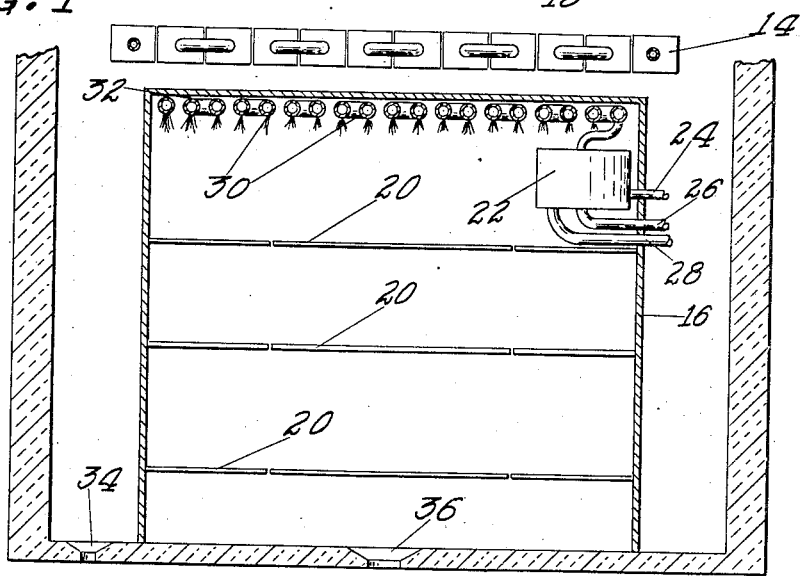
Figure 2 is a vertical section of the same.

In the operation of the present invention, an additional compartment, preferably having walls of metal or the like, as shown at 16, is placed in the large refrigerator 10, preferably at one end or side thereof and with a separate entrance door, as shown at 18. This compartment 16 is closed off from the remainder of the refrigerator 10 in a fairly air-tight manner and is provided with a plurality of open wire shelves or the like 20, as best shown in Figures 1 and 2, upon which vegetables or the like may be conveniently stored.

Mounted in the compartment 16 is an automatic liquid cooling apparatus 22, of which there are several types now on the market and which are designed for the purpose of cooling water or other liquid to a desired temperature, either for continual or intermittent flow. Such a cooler 22 can be designed to operate off the compressor ordinarily used in mechanical refrigeration such as that employed in connection with the coils 14, or may have a separate compressor if desired. The usual intake and outlet pipes 24 and 26 are provided for the passage of refrigerant to and from the cooler 22, and a further inlet pipe 28 for water is of course employed. This water pipe 28, after passing into the cooler 22, extends outwardly therefrom and connects with a system of spray pipes 30 mounted under the top 32 of the cabinet 16 and which spray pipes are adapted to deliver and measure a quantity of water, cooled to a desired temperature, onto the vegetables or other products stored on the shelves 20. The amount of water flowing through the cooler 22 may be regulated as desired or convenient, and the temperature may also be quite accurately controlled by means of the automatic operation of the cooler. Suitable drains 34, 36, etc., are provided for the purpose of carrying off waste water from any and all of the refrigerator compartments.

Figure 3:
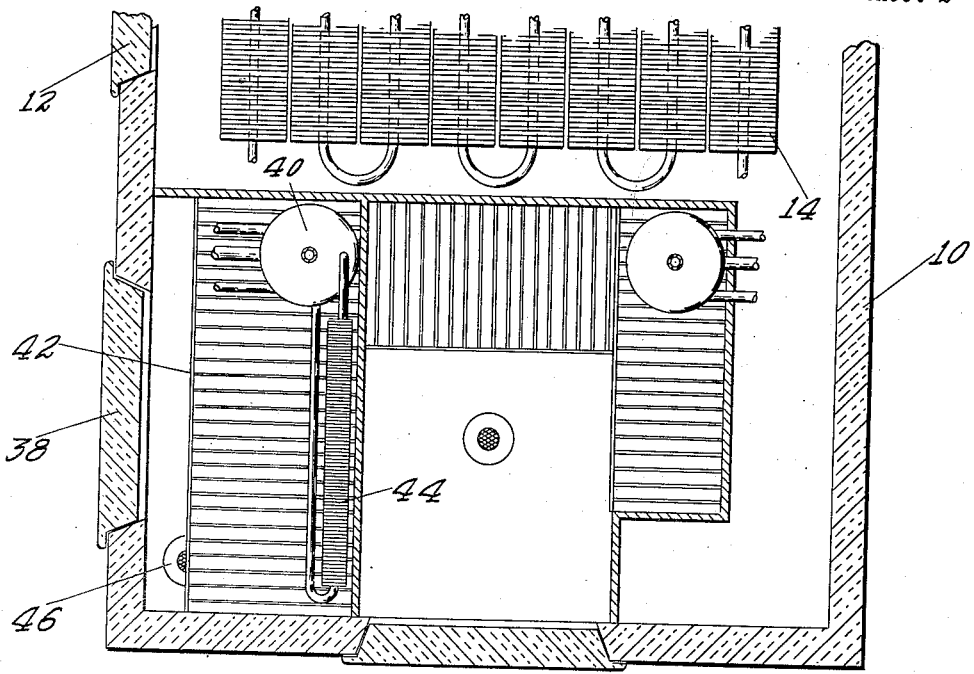
Figure 3 is a horizontal sectional view somewhat similar to that in Figure 1, showing a modified form of the invention.

In Figure 3 is shown a slight modification of the invention, wherein an additional compartment, provided with a further door 38, is built into the refrigerator 10, this being provided with a special type of combination cooler and refrigerating apparatus, as shown at 40.

In addition to cooling spray water which is adapted to be delivered onto products stored on the shelves 42, the apparatus 40 also operates a refrigerating coil 44, by means of which the temperature in the chamber may be brought down to any desired point, preferably below freezing, at desired or regulated intervals.

This chamber is particularly adapted for the storage and preservation of fish, or other similar perishable foods, which, as has been found, can be kept for considerable lengths of time if first coated with water, which is then frozen over the surfaces of the fish or similar products. Water, therefore, of the desired temperature and sufficient amount is first sprayed onto the products on the shelves 42, after which the temperature in the chamber is brought down to below freezing by means of the coil 44, whereupon the desired result is accomplished. Such intermittent spraying and freezing operations can be accomplished either manually or automatically, as desired or convenient. A suitable drain 46 is also provided for this chamber.

Figures 4, 5:
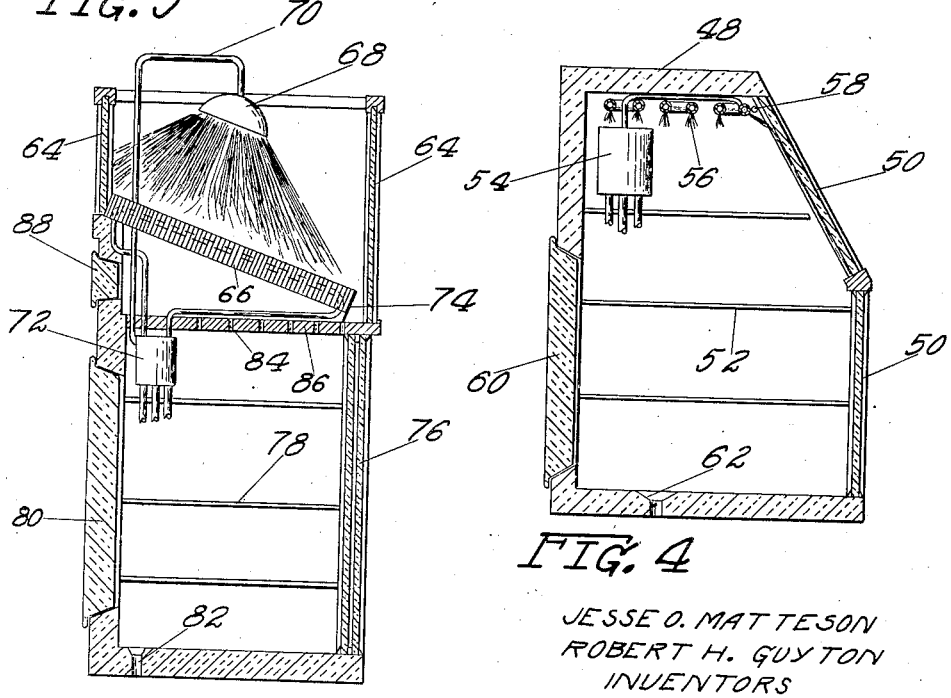
Figure 4 illustrates a further modification of the invention applied to a display cabinet.
Figure 5 illustrates the invention as used in connection with an open, or partially open, display case.

In Figure 4 is illustrated a display cabinet 48, preferably having a transparent front composed of two or more thicknesses of glass or the like 50, and provided with suitable shelves or the like 52 upon which vegetables or other food products may be stored, or displayed. The cabinet contains a combination water cooling and spraying apparatus 54—56 and the spraying apparatus is provided with one spray outlet 58 closely adjacent the upper portion of the glass plates 50, whereby water passing through the equipment will be directed onto the inner face of the glass and will accordingly run down the same, keeping it free from condensed moisture and allowing of a fairly good condition of visibility at all times. The usual door 60 is provided for access, and any suitable type of drain 62 is incorporated into the cabinet.

In Figure 5 is shown a further modification of the invention, wherein a cabinet, open at the top, is provided, this preferably having the front, side and rear walls 64 of glass or the like, which form an enclosed space open at the top, the floor of which constitutes, preferably, an inclined series of refrigerating coils and associated fins, as shown at 66, upon which food or other products are placed for display.

A spray header 68 is provided for a pipe 70 which leads from the water cooling apparatus 72 mounted in the lower portion of the cabinet, and by means of which water of a suitable temperature and desired amount is allowed to spray upon the products on the shelves 66. A suitable drainage opening 74 is provided for excess water, and the compartment preferably has a lower closed portion 76, provided with shelves 78 and a door 80. A suitable drainage opening 82 is provided in the bottom of this compartment. The front face may be of glass if desired, and supplemental drainage openings 84 may be provided in the partition 86 between the upper and lower portions of this cabinet.

Access may be had to the space between the tilted shelf 86 and the horizontal shelf 84 by means of a door or the like 88.

It will be seen that herein is provided a new method of handling vegetables and similar food products in a cooling cabinet which is more or less supplemental to the usual refrigerator construction and which can be built into such a refrigerator at comparatively small additional cost, both in new and old constructions. The combination of desired temperature and humidity will effectively succeed in preserving fresh vegetables and the like for considerably longer periods than has heretofore been considered possible, and the undesirable drying-out and wilting of such products is definitely overcome. The use of a display cabinet which also embodies this feature is a further obviously definite advantage.

We are aware that many changes may be made and numerous details of construction varied throughout a wide range without departing from the principles of this invention, and we therefore do not purpose limiting the patent granted thereon otherwise than as necessitated by the prior art.

We claim as our invention—

A display container for fresh food products, comprising a cabinet, glass faces in the cabinet, grilled shelves in the cabinet for the placing of foods to be displayed thereon, combined humidifying and refrigerating means in the cabinet, said means including a cooling apparatus for lowering the temperature in the cabinet and for also cooling water to be used in the humidifying operation, together with spray means for delivering said cooled water throughout the cabinet, and means for preserving the transparency of the glass fronts, said means comprising a pipe adapted to deliver a portion of the spray water onto the inner faces of the glass.

JESSE O. MATTESON.
ROBERT H. GUYTON.